United States Patent [19]
Friend et al.

[11] Patent Number: 5,611,964
[45] Date of Patent: *Mar. 18, 1997

[54] FIBRIL FILLED MOLDING COMPOSITIONS

[75] Inventors: Stephen O. Friend, Boxford; James J. Barber, Arlington, both of Mass.

[73] Assignee: Hyperion Catalysis International, Lexington, Mass.

[*] Notice: The term of this patent shall not extend beyond the expiration date of Pat. No. 5,591,382.

[21] Appl. No.: 407,266

[22] Filed: Mar. 20, 1995

Related U.S. Application Data

[63] Continuation of Ser. No. 132,127, Oct. 5, 1993, abandoned, which is a continuation of Ser. No. 859,611, Mar. 23, 1992, abandoned, which is a continuation of Ser. No. 385,835, Jul. 27, 1989, abandoned, which is a continuation-in-part of Ser. No. 149,573, Jan. 28, 1988, abandoned, which is a continuation-in-part of Ser. No. 872,215, Jun. 6, 1986, abandoned, which is a continuation-in-part of Ser. No. 678,701, Dec. 6, 1984, Pat. No. 4,663,230.

[51] Int. Cl.$^6$ ............................... H01B 1/00; H01B 1/24
[52] U.S. Cl. ........................ 252/511; 252/502; 524/496; 264/105; 423/447.1
[58] Field of Search ................... 252/502, 511; 423/447.1, 447.3, 447.7; 264/105; 524/495, 496

[56] References Cited

U.S. PATENT DOCUMENTS

| | | | |
|---|---|---|---|
| 2,796,331 | 6/1957 | Kauffman et al. | 423/447.3 |
| 3,671,411 | 6/1972 | Ray et al. | 204/130 |
| 4,382,882 | 5/1983 | Vogel et al. | 252/500 |
| 4,404,125 | 9/1983 | Abolins et al. | 252/511 |
| 4,461,719 | 7/1984 | Vogel et al. | 252/500 |
| 4,474,906 | 10/1984 | Nakama et al. | 524/205 |
| 4,491,536 | 1/1985 | Tomoda | 252/511 |
| 4,525,147 | 6/1985 | Pitz et al. | 433/224 |
| 4,559,164 | 12/1985 | Kostelnik et al. | 252/502 |
| 4,565,683 | 1/1986 | Yates et al. | 423/447.3 |
| 4,572,813 | 2/1986 | Arakawa et al. | 423/447.3 |
| 4,663,230 | 5/1987 | Tennent | 428/367 |
| 4,664,900 | 5/1987 | Miyazaki et al. | 252/510 |
| 4,664,971 | 5/1987 | Soens | 252/511 |
| 4,704,413 | 11/1987 | Nabeta et al. | 252/511 |
| 4,743,646 | 5/1988 | Miura et al. | 524/504 |
| 4,748,436 | 5/1988 | Kanamori et al. | 338/214 |
| 4,816,289 | 3/1989 | Komatsu et al. | 423/447.3 |
| 5,098,771 | 3/1992 | Friend | 428/209 |

FOREIGN PATENT DOCUMENTS

| | | |
|---|---|---|
| 0198558 | 10/1986 | European Pat. Off. . |
| 59-152298 | 8/1984 | Japan . |
| 61-132600 | 6/1986 | Japan . |
| 63-248857 | 10/1988 | Japan . |
| 63-280786 | 11/1988 | Japan . |
| 63-286437 | 11/1988 | Japan . |
| 63-286443 | 11/1988 | Japan . |
| 63-286469 | 11/1988 | Japan . |
| 63-286468 | 11/1988 | Japan . |
| 1469930 | 4/1977 | United Kingdom . |
| 8707559 | 12/1987 | WIPO . |

OTHER PUBLICATIONS

Oberlin et al., *Journal of Crystal Growth* vol. 32, pp. 335–349 1976.
"Beacon Gas–Conversion Process Yields Useful Carbon Materials" (R&D—Jan. 1987).
Endo, "Grow Carbon Fibers in the Vapor Phase", Chemtech, pp. 568–576 (Sep. 1988).
Tibbetts et al., SAMPE Journal (Sep./Oct. 1986), pp. 30–35.

*Primary Examiner*—Paul Lieberman
*Assistant Examiner*—M. Kopec
*Attorney, Agent, or Firm*—Curtis, Morris & Safford, P.C.; Barry Evans

[57] ABSTRACT

A composite that includes a reaction injection molded matrix into which carbon fibrils have been incorporated, and a molding composition suitable for preparing such a composite. The invention also features a composite that includes a premix in which carbon fibrils have been incorporated into a resin matrix, and the molded product of the premix.

34 Claims, No Drawings

FIBRIL FILLED MOLDING COMPOSITIONS

This application is a continuation of Ser. No. 08/132,127, filed Oct. 5, 1993 and now abandoned, which application is a continuation of Ser. No. 07/859,611, filed Mar. 23, 1992 and now abandoned, which application is a continuation of Ser. No. 07/385,835, filed Jul. 27, 1989 and now abandoned, which application is a continuation-in-part of Ser. No. 07/149,573, filed Jan. 28, 1988 and now abandoned, which application is a continuation-in-part of Ser. No. 06/872,215, filed Jun. 6, 1986 and now abandoned, which application is a continuation-in-part of Ser. No. 06/678,701, filed Dec. 6, 1984 now U.S. Pat. No. 4,663,230.

BACKGROUND OF THE INVENTION

This invention relates to molding compositions.

Reaction injection molding ("RIM") is a molding process in which one or more liquid or blending reactants are metered separately to a mixing head which combines them e.g., by high-impingement mixing. The mixture then is injected into a mold where it polymerizes to form a molded part. In structural reaction injection molding ("SRIM"), which is often referred to as reinforced reaction injection molding ("RRIM"), reinforcements such as chopped glass fiber or particulate mineral fillers are added to the mixture prior to molding. In another type of SRIM process, a low viscosity, partially polymerized RIM composition is injected into a mold filled with woven fiber mat, and the resulting composition molded. In both the RIM and SRIM processes, the molded parts are coated prior to use to provide ultraviolet protection and to match other parts.

A second type of molding process involves premix. Premix is a molding composition prepared prior to and apart from the molding operation which contains all the components necessary for molding, e.g., resin, reinforcing agents, fillers, catalysts, release agents, etc. One type of premix is called sheet molding compound ("SMC"). SMC is a thin, semi-tacky sheet of thermosetting resin typically reinforced with chopped or continuous strand glass fibers. The sheet can be molded to form a variety of parts using, e.g., matched die molding techniques. A second type of premix is called bulk molding compound ("BMC"). BMC is prepared in the form of a putty that can be directly molded. It can also be extruded in the form of a bar or log to facilitate handling. Like the RIM and SRIM molded products, the molded premix products also are often coated prior to use.

Carbon fibrils are carbon filaments having diameters less than 500 nanometers. Examples of particular carbon fibrils and methods for preparing them are described in the above-referenced Snyder et al. application; Tennent, U.S. Pat. No. 4,663,230 ("Carbon Fibrils, Method for Producing Same and Compositions Containing Same"); Tennent et al., U.S. Ser. No. 871,676 filed Jun. 6, 1989 ("Novel Carbon Fibrils, Method for Producing Same and Compositions Containing Same"); Tennent et al., U.S. Ser. No. 871,675 filed Jun. 6, 1986 ("Novel Carbon Fibrils, Method for Producing Same and Encapsulated Catalyst"); Mandeville et al., U.S. Ser. No. 285,817 filed Dec. 16, 1988 ("Fibrils"); and McCarthy et al., U.S. Ser. No. 351,967 filed May 15, 1989 ("Surface Treatment of Carbon Microfibers"), all of which are assigned to the same assignee as the present application and are hereby incorporated by reference in their entirety.

SUMMARY OF THE INVENTION

In general, the invention features a composite that includes a matrix into which carbon fibrils are incorporated, the amount of the fibrils being sufficient to permit the composite to be directly electrostatically overcoated (i.e. without applying a primer coat first).

In one aspect, the composite includes a reaction injection molded matrix into which carbon fibrils have been incorporated.

In a second aspect, the composite includes the molded product of a premix that includes a resin matrix into which carbon fibrils have been incorporated.

In preferred embodiments, the premix is a sheet molding compound or a bulk molding compound. The electrical conductivity of the composite preferably is greater than the electrical conductivity of a composite in which the same matrix is filled with an equivalent amount of carbon black. The amount of fibrils in the composite preferably is sufficient to impart to the composite an electrical conductivity sufficiently high to permit direct electrostatic overcoating. Also preferred are composites in which the amount of fibrils is sufficient to dissipate static electricity. Preferably, the amount is less than or equal to 20% by weight (based on resin), more preferably less than or equal to 4% by weight.

The fibrils preferably are tubes having graphitic layers that are substantially parallel to the fibril axis. One aspect of substantial parallelism is that the projection of the graphite layers on the fibril axis extends for a relatively long distance in terms of the external diameter of the fibril (e.g., at least two fibril diameters, preferably at least five diameters), as described in Snyder et al., U.S. Ser. No. 149,573. These fibrils preferably are also free of a continuous thermal carbon overcoat (i.e. pyrolytically deposited carbon resulting from thermal cracking of the gas feed used to prepare the fibrils). The fibrils preferably have diameters between 3.5 and 75 nanometers, inclusive, and a length to diameter ratio of at least five. Also preferred are fibrils having this morphology in which the outer surface of the graphitic layers is bonded to a plurality of oxygen-containing groups (e.g., a carbonyl, carboxylic acid, carboxylic acid ester, epoxy, vinyl ester, hydroxy, alkoxy, isocyanate, or amide group), or derivatives thereof (e.g., a sulfhydryl, amino, or imino group).

Initially, the method of oxidizing the surface of carbon fibrils includes contacting the fibrils with an oxidizing agent that includes sulfuric acid ($H_2SO_4$) and potassium chlorate ($KClO_3$) under reaction conditions (e.g., time, temperature and pressure) sufficient to oxidize the surface.

Second, the length of carbon fibrils is decreased by reacting the fibrils with an oxidizing agent under reaction conditions (e.g., time, temperature and pressure) sufficient to decrease the length by chopping fibrils. Preferably, the oxidizing agent includes sulfuric acid and potassium chlorate. In preferred embodiments, the oxidizing agent is in the liquid phase.

The fibrils prepared according to the above-described process may be incorporated in a matrix. Preferably, the matrix is an organic polymer (e.g., a thermoset resin such as epoxy, bismaleimide, polyimide, or polyester resin; a thermoplastic resin; a reaction injection molded resin; or an elastomer such as natural rubber, styrene-butadiene rubber, or cis-1,4-polybutadiene), an inorganic polymer (e.g., an polymeric inorganic oxide such as glass), a metal (e.g., lead or copper), or a ceramic material (e.g., Portland cement). The fibrils may also form an adsorbent or polymerization initiator.

The invention provides a simple and effective method for introducing, through an oxidation reaction, a wide variety of functional groups onto the surface of fibrils. Moreover, the treatment does not leave heavy metal residues on the surface of the fibrils. The invention also effectively reduces fibril length by "chopping up" the fibrils. Reducing the length aids in decreasing fibril entanglement, thereby improving the tractability and dispersibility of the fibrils, two properties which are desirable in composite fabrication.

Other preferred matrix materials include thermoplastic resins (e.g., polyamide, polyurethane, polyurea, or an elastomer) and thermoset resins (e.g., polydicyclopentadiene, polyester, thermosetting polyurethane, or epoxy resins, or vinylacrylimide resins (such as the Arimix resins commercially available from Ashland Chemical Co., Columbus, Ohio). Resin mixtures may also be used. Either composite preferably is molded in the form of an automotive part for a car, truck, or bus.

In a third aspect, the invention features a composite in a form suitable for reaction injection molding that includes one or more liquid reactants capable of polymerizing to form a reaction injection molded matrix and carbon fibrils.

In a fourth aspect, the invention features a premix that includes a resin into which carbon fibrils are incorporated.

In preferred embodiments, the liquid reactants include one or more polyols, polyisocyanates, or polyamines. The premix preferably is a bulk molding compound or a sheet molding compound. The amount of fibrils is preferably less than or equal to 20% by weight, more preferably less than or equal to 4% by weight. Preferred fibrils and resins are those described above.

The invention also features methods for preparing the above-described composites.

The reaction injection molded composite is prepared by a method that includes mixing the fibrils with liquid reactants capable of polymerizing to form the matrix; introducing the mixture into a mold; and molding the mixture under reaction conditions including pressure and temperature to prepare the composite in the form of a molded part.

The sheet molding compound composite is prepared by a method that includes mixing the fibrils with a resin and forming the mixture into a sheet. The bulk molding compound composite is prepared by a method that includes mixing the fibrils with a resin to form a putty suitable for molding. Both methods preferably include a molding step in which the composite is prepared in the form of a molded part under reaction conditions that include temperature and pressure.

The molded parts prepared according to the above-described methods are preferably directly electrostatically coated once molding is complete.

The invention provides reaction injection molded composites and molded composites prepared from premix (e.g., sheet molding compound or bulk molding compound) that are electrically conductive at relatively low fibril loadings. This enables molded parts prepared from the composites to be electrostatically coated just as metal parts currently are, thereby eliminating the need for applying a conductive primer coat in a separate application. Further advantages that the fibrils provide include good mechanical properties (e.g., hardness and impact strength) and the ability to use reduced amounts of additives such as flame retardants. The fibrils also provide inherent EMI shielding.

The use of fibrils offers several processing advantages as well, including good batch to batch consistency with respect to electrical and mechanical properties. In the case of RIM processing, the fibrils, due to their small size, do not plug small lines and orifices in the processing equipment at the low fibril loadings used. Moreover, the fibrils need not become preferentially oriented during processing; thus, they do not contribute to part warpage. In the case of SMC, the increase of viscosity due to the fibrils makes it possible to eliminate thickeners needed to form the tacky sheet.

Other features and advantages of the invention will be apparent from the following description of the preferred embodiments thereof, and from the claims.

DESCRIPTION OF THE PREFERRED EMBODIMENTS

By way of the following examples, the preparation of sheet molding compound (SMC) composites, bulk molding compound (BMC) composites, and reaction injection molded (RIM) composites into which carbon fibrils have been incorporated are described. In addition, the oxidation treatment of carbon fibrils is also described. Preferred fibrils have small diameters (preferably between 3.5 and 75 nanometers), graphitic layers that are substantially parallel to the fibril axis, and are substantially free of a continuous thermal carbon overcoat, as described in Tennent, U.S. Pat. No. 4,663,230; Tennent et al., U.S. Ser. No. 871,675; Tennent et al., U.S. Ser. No. 871,676; Snyder et al., U.S. Ser. No. 149,573; and Mandeville et al., U.S. Ser. No. 285,817. These fibrils are prepared as described in the aforementioned patent and patent applications. The fibrils may also be treated to introduce oxygen-containing functional groups onto the fibril surface.

In general, the fibrils are oxidized by contacting them with a solution of potassium chlorate dissolved in concentrated sulfuric acid. The treatment is conducted at room temperature in air. The initial oxidation reaction creates oxygen-containing functional groups on the surface of the fibrils. Continuing exposure to the oxidizing solution cleaves the fibrils, thereby reducing the fibril length.

EXAMPLE 1 g of potassium chlorate was dissolved in 50 ml of concentrated sulfuric acid and added slowly to approximately 1–2 g of the above-described carbon fibrils. The oxidation reaction was then allowed to proceed in air for 30 minutes. Upon stirring, fibrils became suspended in the acidic medium, resulting in a black, gelatinous suspension. Close examination of a more dilute suspension revealed that the fibrils were not uniformly distributed but instead remained associated in clumps. At the end of the reaction, the fibrils were collected on a medium porosity (about 5 μm) frit and washed with about 500 ml each of deionized water (until the filtrate had a pH of about 7) and methanol. Following filtration, all of the fibrils appeared to be retained on the frit. The fibrils were then dried first in a Schlenk tube at 70° C. under vacuum (50 mtorr) and then at 180° C. under flowing nitrogen.

The above procedure was repeated except that the oxidation reaction was allowed to proceed for 24 hours. Following filtration, the filtrate was slightly dark and cloudy, indicating the presence of small particles. Filtration through a 0.22 μm Millipore filter resulted in removal of the particles, indicating an effective length between 5 and 0.2 μm. Thus, this second reaction resulted in chopped-up fibrils having reduced lengths.

Samples from both reactions were then analyzed for carbon and oxygen content to reveal the presence of oxygen-containing groups using XPS spectroscopy. The results, shown in Table I below, indicate that the oxidation reaction introduces a significant change in the atomic composition. No residual sulfur, chlorine or potassium was observed. Moreover, a control reaction, using only sulfuric acid, resulted in no significant change in the atomic composition.

TABLE I

| Sample | % Carbon | % Oxygen |
| --- | --- | --- |
| Pre-oxidation | 98.4 | 1.6 |
| Oxidized 30 minutes | 91.9 | 8.1 |
| Oxidized 24 hours | 90.7 | 9.3 |
| $H_2SO_4$, 30 minutes | 98.1 | 1.9 |

EXAMPLE 1—RIM

Fibril-containing RIM composites are prepared using conventional RIM processing equipment. Such equipment typically includes a material conditioning system, a high pressure metering system, a mix head, a mold, and a mold carrier.

The material conditioning system includes tanks that hold the reactants for preparing the composite (each reactant being stored in a separate tank), agitators to maintain homogeneous temperature and composition conditions throughout the tanks, and a temperature control system for maintaining the proper level of dissolved gases in the reactants. The fibrils are preferably pre-mixed with one or more of the reactants in an amount sufficient to result in 1–4 weight % fibrils in the final molded product. Additional tanks store additives such as pigments and catalysts, as well as any additional reinforcement, e.g., chopped glass fibers. Preferred reactants include polyols and polyamines and polyisocyanates (for preparing polyurea matrices).

The metering system, which typically consists of, e.g., high pressure axial or radial piston pumps or lance-displacement cylinders, meters the proper amount of reactants, fibrils, and any additional fillers to the mixing head. The mixing head contains a chamber in which the reactants and fillers are mixed by direct impingement at pressures between, for example, 1500 and 3500 psi. When mixing is complete, the mixture is transported to a mold where the reactants polymerize to form the final part. Suitable mold constructions include machined steel or aluminum, cast aluminum or kirksite, spray metal or electroplated shells, and filled epoxy resin. Typical in-mold pressures during polymerization are 25–100 psi. The molding temperature varies according to the particular reactants being used, as one of ordinary skill in the art will readily appreciate. In the case of polyurethane-forming reactants, the mold temperature is about 130° F. (±70° F.). A mold carrier orients the mold, provides a clamping force to overcome the in-mold pressure, opens and closes the mold, and positions the mold for removal of the finished part, cleaning, and preparation for the next molding operation.

The fibril-containing RIM composites are useful in a wide variety of molded industrial and consumer products. They are particularly useful in automotive parts, e.g., bumpers, trim parts, fascia, integral window seals, steering wheels, armrests, protective covers, and body panels for cars, trucks, or buses. The parts are coated prior to use. By incorporating carbon fibrils, the parts can be electrostatically coated, making fabrication compatible with the processing of metal parts.

EXAMPLE 2—SMC

Fibril-containing SMC composites are prepared using conventional SMC processing equipment. This equipment, which may be continuous belt or beltless, typically includes a mixing system, a paste metering system, a compaction system, and a take-up system.

The mixing system compounds the uncured resin (typically an unsaturated, thermosetting polyester or epoxy resin which cures upon application of heat) and additives such as catalysts, fillers, thickeners, mold release agents, pigments, thermoplastic polymers (e.g., polyvinyl chloride polymers and copolymers and polyethylene powders for minimizing shrinkage during molding), flame retardants, and ultraviolet absorbers into a paste having the consistency of pancake batter suitable for forming into a sheet. The paste also contains carbon fibrils. The mixing system may be of the batch, batch/continuous, or continuous type.

The paste is transported from the mixing system to a paste reservoir which, with the aid of adjustable doctor blades, meters a predetermined thickness of paste onto upper and lower plastic (e.g., polyethylene) carrier films. The height of the doctor blades determines the amount of resin paste in the final SMC composite. Between the two paste-covered sheets, reinforcing agents, e.g., chopped glass strand or continuous glass roving are applied to form a sandwich. Additional carbon fibrils may also be added at this stage. The total amount of carbon fibrils (i.e. the sum of the fibrils added during compounding of the paste plus any fibrils applied directly to the paste-covered sheets) preferably is between 1 and 4% by weight based upon resin.

A compactor compresses the sandwich to ensure that the resin paste wets the fibrils and any other reinforcement. Typically, the compactor consists of a series of serrated steel rollers or a dual wire mesh belt compaction module. The sheet exiting the compactor is then taken up, e.g., by a wind-up turret to form a roll. When a full roll of the composite is ready, the sheet (which typically is 2–5 feet wide) is cut and transferred to a second wind-up turret. The roll is then taped to prevent unwinding and a vapor barrier sleeve applied to prevent ultraviolet or moisture contamination. The roll is stored in a maturation room maintained at about 85°–90° F. for approximately 1–7 days to provide a uniform, reproducible viscosity for molding. The sheet is then cut and molded into the desired part using, e.g., compression or matched die molding.

The molded components thus prepared are useful in a variety of applications. In the automotive industry, they are useful as components of heating and ventilating systems, hoods, trunks, side panels, fenders, roof panels, front end panels incorporating fender extensions, mounts for headlamps and grilles, and cab components (e.g., hoods) for trucks. The molded composites are also useful as electrical switchgear housings, housings for hand power tools such as electric drills, and housings for appliances such as air conditioners and dishwashers. As in the case of the fibril-containing RIM composites, the parts can be electrostatically coated.

EXAMPLE 3—BMC

Fibril-containing BMC composites are prepared using conventional BMC processing equipment. Typically, this equipment consists of two mixers. The first mixer, e.g., a simple propeller type, or dissolver or dispenser of the kind used in the paint industry, is used to mix the resin (e.g., unsaturated thermosetting polyester or epoxy resin as in the case of SMC composites) and additives such as particulate fillers, mold release agents, colorants, catalyst, thickeners, and low profile additives. The carbon fibrils also are preferably added to the resin mix. The components are well-mixed to disperse the additives and fibrils throughout the resin. The resulting mixture is then transferred to a second, heavy duty mixer, e.g., a dough mixer or double arm mixer, and additional reinforcing agents such as glass fibers (in the form of chopped strand or chopped spun roving), asbestos, sisal, and organic fibers are added. An additional amount of carbon fibrils may also be added at this time. The total amount of carbon fibrils (i.e. the sum of the fibrils added during both mixing stages) is between 1 and 4% by weight based upon resin.

The second mixer mixes the components until the resulting mixture has the consistency of putty. The putty is then aged (e.g., for about 4 hours at 77° F.). When aging is complete, the putty can be molded directly or stored in a sealed, refrigerated, plastic bag until needed. The putty can also be extruded in the form of bars or logs prior to aging to facilitate handling and storage.

The fibril-reinforced BMC premix is molded using conventional thermoset molding techniques, e.g., compression, transfer, or thermoset injection molding at pressures sufficient to cause the premix to flow into the extremities of the mold; typical molding pressures range from about 100–1500 psi. The molded parts are useful in many of the same applications as SMC molded parts. Additional uses include automobile heater housings and related ducting. Like the RIM and SMC molded parts, the BMC molded parts can be electrostatically coated without prior application of an electrically conductive primer coat.

Other embodiments are within the following claims.

For example, fibrils can be incorporated into a wide variety of matrices (e.g., both thermoplastic and thermoset matrices) in order to render the resulting composite sufficiently electrically conductive to permit direct electrostatic overcoating.

We claim:

1. A shaped composite comprising a reaction injection molded polymer matrix containing about 0.5% to about 20% by weight of graphitic carbon fibrils having a diameter of between 3.5 and 75 nanometers, inclusive, and a length to diameter ratio of at least 5.

2. A composite comprising the molded product of a premix that includes a polymer resin matrix containing about 0.5% to about 20% by weight of graphitic carbon fibrils having a diameter of between 3.5 and 75 nanometers, inclusive, and a length to diameter ratio of at least 5.

3. The composite of claim 2 wherein said premix is a bulk molding compound.

4. The composite of claim 1 or 2 wherein the amount of said fibrils is less than or equal to 20% by weight and is sufficient to impart to said composite an electrical conductivity sufficiently high to permit direct electrostatic overcoating.

5. The composite of claim 1 or 2 wherein the electrical conductivity of said composite is greater than the electrical conductivity of a composite in which the same matrix is filled with an equivalent amount of carbon black.

6. The composite of claim 1 or 2 wherein the amount of said fibrils is less than or equal to 20% by weight.

7. The composite of claim 6 wherein the amount of said fibrils is less than or equal to 4% by weight.

8. The composite of claim 1 or 2 wherein the amount of said fibrils is less than or equal to 4% by weight and is sufficient to impart to said composite an electrical conductivity sufficiently high to permit direct electrostatic overcoating.

9. The composite of claim 1 or 2 wherein the amount of said fibrils is less than or equal to 20% by weight and is sufficient to impart to said composite an electrical conductivity sufficiently high to dissipate static electricity.

10. The composite of claim 1 or 2 wherein the amount of said fibrils is less than or equal to 4% by weight and is sufficient to impart to said composite an electrical conductivity sufficiently high to dissipate static electricity.

11. The composite of claim 1 or 2 wherein said fibrils comprise tubes having graphitic layers that are substantially parallel to the fibril axis.

12. The composite of claim 11 wherein the length to diameter ratio of said fibrils is at least 5.

13. The composite of claim 11 wherein the diameter of said fibrils is between 3.5 and 75 nanometers, inclusive.

14. The composite of claim 11 wherein said fibrils are free of a continuous coating of pyrolytically deposited thermal carbon resulting from thermal cracking of the gas feed used to prepare the fibrils.

15. The composite of claim 11 wherein the outer surface of said graphitic layers has bonded thereto a plurality of oxygen-containing groups, said oxygen-containing groups being selected from the group consisting of carbonyl, carboxylic acid, carboxylic acid ester, epoxy, vinyl ester, hydroxy, alkoxy, isocyanate, and amide groups, or derivatives thereof.

16. The composite of claim 1 or 2 wherein said matrix comprises a thermoplastic material.

17. The composite of claim 16 wherein said matrix comprises a polyamide, polyurethane, or polyurea, or a mixture thereof.

18. The composite of claim 1 or 2 wherein said matrix comprises a thermoset material.

19. The composite of claim 18 wherein said matrix comprises a polydicyclopentadiene, polyester, thermosetting polyurethane, vinylacrylimide, or epoxy resin, or a mixture thereof.

20. The composite of claim 1 or 2 wherein said composite is molded in the form of an automotive part that is overcoated prior to use.

21. A composite in a form suitable for reaction injection molding comprising one or more liquid reactants capable of being injected into a mold and polymerizing therein to form a reaction injection molded polymeric matrix containing about 0.5% to about 20% by weight of graphitic carbon fibrils having a diameter of between 3.5 and 75 nanometers, inclusive, and a length to diameter ratio of at least 5.

22. A premix comprising a resin containing about 0.5% to about 20% by weight of graphitic carbon fibrils having a diameter of between 3.5 and 75 nanometers inclusive, and a length to diameter ratio of at least 5.

23. The premix of claim 22 wherein said premix is in the form of a sheet molding compound.

24. The premix of claim 22 wherein said premix is in the form of a bulk molding compound.

25. The composition of claim 21 or 22 wherein the amount of said fibrils is less than or equal to 20% by weight.

26. The composition of claim 25 wherein the amount of said fibrils is less than or equal to 4% by weight.

27. The composition of claim 21 or 22 wherein said fibrils comprise tubes having graphitic layers that are substantially parallel to the fibril axis.

28. The composition of claim 27 wherein said fibrils are free of a continuous coating of pyrolytically deposited thermal carbon resulting from thermal cracking of the gas feed used to prepare the fibrils.

29. The composition of claim 27 wherein the outer surface of said graphitic layers has bonded thereto a plurality of oxygen-containing groups, said oxygen-containing groups being selected from the group consisting of carbonyl, carboxylic acid, carboxylic acid ester, epoxy, vinyl ester, hydroxy, alkoxy, isocyanate, and amide groups, or derivatives thereof.

30. The composition of claim 21 wherein said liquid reactants comprise one or more polyols, polyisocyanates, or polyamines.

31. The composition of claim 22 wherein said resin comprises a thermosetting resin.

32. A shaped composite comprising a matrix into which graphitic carbon fibrils having a diameter of between 3.5 and 75 nanometers, inclusive, and a length to diameter ratio of at least 5 are incorporated, the amount of said fibrils being about 0.5% to 20% by weight and sufficient to permit said composite to be directly electrostatically overcoated.

33. The composite of claim 16 wherein said matrix comprises an elastomer.

34. The composite of claim 2, wherein said premix is a sheet molding compound.

* * * * *